United States Patent
Helmer, Jr. et al.

(10) Patent No.: US 7,552,232 B2
(45) Date of Patent: Jun. 23, 2009

(54) SPECULATIVE METHOD AND SYSTEM FOR RAPID DATA COMMUNICATIONS

(75) Inventors: Leonard W. Helmer, Jr., Stone Ridge, NY (US); Patricia E. Heywood, Hopewell Junction, NY (US); Paul DiNicola, Hurley, NY (US); Steven J. Martin, Poughkeepsie, NY (US); Gregory Salyer, Poughkeepsie, NY (US); Carol L. Soto, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 10/692,496

(22) Filed: Oct. 24, 2003

(65) Prior Publication Data

US 2005/0091390 A1    Apr. 28, 2005

(51) Int. Cl.
*G06F 15/16* (2006.01)
(52) U.S. Cl. .......... 709/236; 709/231; 709/238; 709/232; 370/342; 370/335; 370/320; 714/721; 714/718; 455/231; 455/343.2; 365/185.22; 365/185.17; 365/201; 365/194; 365/189.05
(58) Field of Classification Search ............ 709/231, 709/236, 238, 232; 365/185.22, 201, 194, 365/185.17, 185.18, 189.05, 185.12; 370/342, 370/335, 320; 368/10; 714/721, 718; 455/231, 455/343.2; 375/152, 326, 130, 343
See application file for complete search history.

(56) References Cited

U.S. PATENT DOCUMENTS

| | | | |
|---|---|---|---|
| 5,522,039 A * | 5/1996 | Snyder et al. | 714/52 |
| 5,732,086 A | 3/1998 | Liang et al. | |
| 5,805,593 A | 9/1998 | Busche | |
| 5,944,779 A | 8/1999 | Blum | |
| 6,041,057 A | 3/2000 | Stone | |
| 6,047,323 A | 4/2000 | Krause | |
| 6,385,174 B1 | 5/2002 | Li | |
| 6,442,613 B1 | 8/2002 | Gregg et al. | |
| 6,456,599 B1 | 9/2002 | Elliott | |
| 2003/0058878 A1* | 3/2003 | Minnick et al. | 370/412 |
| 2004/0034718 A1* | 2/2004 | Goldenberg et al. | 709/250 |

* cited by examiner

*Primary Examiner*—Ario Etienne
*Assistant Examiner*—Barbara N Burgess
(74) *Attorney, Agent, or Firm*—Larry D. Cutter; Jeffrey N. Giunta; Fleit Gibbons Gutman Bongini & Bianco P.L.

(57) ABSTRACT

A system and method that utilizes a dedicated transmission queue to enable expedited transmission of data messages to adaptive "nearest neighbor" nodes within a cluster. Packet descriptors are pre-fetched by the communications adapter hardware during the transmission of the preceding data element and setup for the next transmission is performed in parallel with the transmission of the preceding data element. Data elements of a fixed length that is equal to the cache line size of the communication hardware can optionally be used to provide optimized transfer between computer memory and communications hardware. The data receiving processing can also be optimized to recognize and handle cache line size data elements.

19 Claims, 9 Drawing Sheets

SPECULATIVE METHOD AND SYSTEM FOR RAPID DATA COMMUNICATIONS

BACKGROUND OF THE INVENTION

1. Field of the Invention

This invention relates to data communications processing and more specifically to data communications among data processors.

2. Description of Related Art

In order to more efficiently solve a single, generally large scale computational problem, automated data processing tasks are sometimes distributed across two or more processors with the processes on each processor working together in a coordinated way by communicating data between the multiple processors. These multiple processors are frequently organized as groups or clusters. One or more of the processors within a cluster are referred to as a "node." The different nodes of a cluster are connected by a data communications system that supports data communications among all of the cluster member nodes. A computing system that supports the use of distributing tasks across multiple processors within a cluster can be structured so that each computing task on a computing node communicates mainly with computing nodes that are defined as its nearest neighbors.

Message passing techniques are used to pass data from one task to another. A message is generally sent by copying the data of the message into packet size chunks of bytes and injecting each of those packets into the network via a transport communications processing layer. This is commonly referred to as a "push" model. The packet size is determined by many factors, including the architecture and implementation of the particular computing system, but packets used to communicate data are not generally a constant size. Receiving a message generally involves the converse of the processing used to send a message. The demands of high performance computing require that the delivery of packets be optimized for minimum latency.

Examples of message passing architecture include using sending and receiving First In, First Out (FIFO) data buffers that support generalized operations for sending and receiving data, including communications between processes operating in parallel as part of a single task. In a conventional FIFO data structure, the item that is stored or queued for transmission for the longest time is the next item to be retrieved by the transmission circuits of a communications adapter and transmitted. The interface for generalized packet send operations allows for the message passing protocol to indicate various characteristics of each packet, such as packet length and destination. These characteristics can be different for each send operation. All send operations from a given task go into a single send FIFO buffer and are processed in order by the communications adapter hardware. Conventional packet transport layer software does not generally receive information about the length or destination of future data packets.

Some data packet communications system architectures use a "continuing indicator" within a data packet to indicate that another data packet follows as part of the same transmission. The data transmission control software sets and tests the continuing indicator bit in each packet. Unless the data packet is communicated in a point-to-point connection, the continuing indicator bit gives no indication of the target destination of the packet nor does it provide any information about the length of the packet.

These communications architectures provide a standard message passing interface regardless of the destination of the data. In a computing cluster environment, however, data packets that are communicated to other nodes within the cluster have the same processing overhead as data packets destined for any other node in electronic communications with the sending node. This is true even though each node within a cluster generally sends many packets to other nodes in the same cluster, thereby introducing a large amount of communications processing overhead processing.

Therefore a need exists to overcome the problems with the prior art as discussed above.

SUMMARY OF THE INVENTION

Briefly, in accordance with the present invention, a method, in a computer node, for transferring a data message, the method comprises transferring a first data element to a speculatively pre-defined destination and concurrently loading a packet descriptor, which speculates on the identity of the next destination, into a communications adapter. The method also includes transferring, based upon the packet descriptor, a second data element to the speculated destination.

In another aspect of the present invention, a computing node includes a fast data element transmitter for transferring a first data element and a second data element to a speculatively pre-defined destination. The computing node also has a fast descriptor interface for loading a packet descriptor concurrently with the transferring of the first data element. The packet descriptor speculatively predefines the destination and is used to configure the fast data element transmitter for transferring the second data element.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter that is regarded as the invention is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DESCRIPTION OF THE PREFERRED EMBODIMENTS

The present invention, according to a preferred embodiment, overcomes problems with the prior art by providing a system, a signal bearing medium and method that utilizes dedicated transmission queues to enable expedited transmission of data messages to adaptive "nearest neighbor" nodes within a cluster in which the embodiment is operating. Embodiments of the present invention implement expedited transmission processing to transmit data to one or more nearest neighbors, dependent upon the configuration of the cluster and the computing resources available to that embodiment. The following description focuses upon expedited transmission processing to a single destination in order to more clearly describe the features of the present invention. Parallel expedited transmission processing structures can be incorporated into a computing node to provide expedited transmission processing to a plurality of pre-defined destinations. It will also be apparent to those skilled in the art that present invention may be practiced in other embodiments and may depart from the specific details of the embodiments described herein.

Computing System Group

Figure 1:
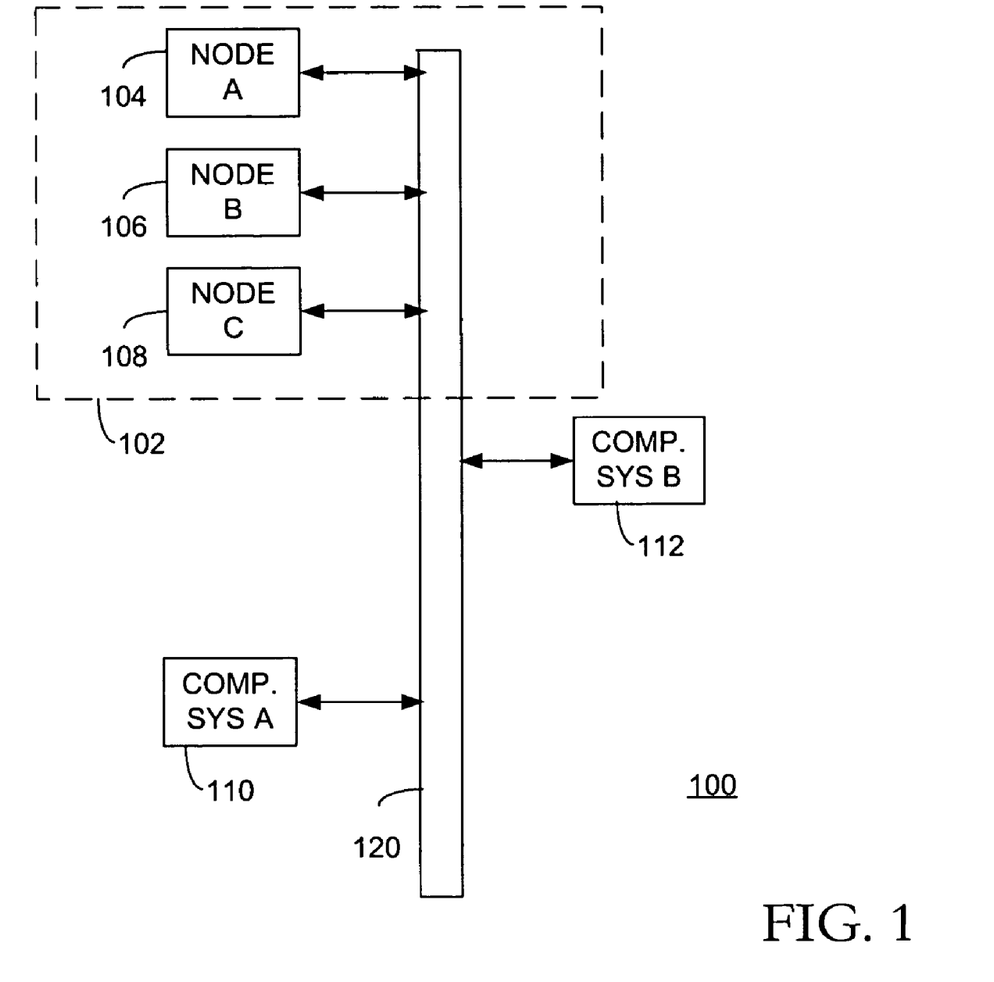
FIG. 1 is a block diagram illustrating an overall computing system network architecture according to an exemplary embodiment of the present invention.

Referring now in more detail to the drawings in which like numerals refer to like parts throughout several views, an exemplary computing system network architecture 100 in which exemplary embodiments of the present invention operate is illustrated in FIG. 1. The exemplary computing system group 100 shows a shared communications network 120 that is used to communicate data messages among several computers. The exemplary computing system network architecture 100 includes a computing cluster 102 that includes three computing nodes, Node A 104, Node B 106 and Node C 108. The computing nodes within the computing cluster 102 are considered "nearest neighbors" to each other and operate in a cooperative manner. Each of the computing nodes within a cluster can execute a process that is operating in conjunction with a process that is operating on another computer node within the cluster. Data is frequently communicated between the cooperating processes that are executing on different computing nodes. The computing nodes of the exemplary embodiment utilize expedited data transmission processing to more efficiently communicate data among computing nodes that form a computing cluster 102.

In addition to the computing nodes within cluster 102, the exemplary computing system group 100 further includes other computing systems, Computing System A 110 and Computing System B 112. The three nodes of this exemplary cluster 102 communicate via the shared communications network 120 that also provides communications among the other computing systems, i.e., Computing System A 110 and Computing System B 112.

Computer Nodes and Group Members

Figure 2:
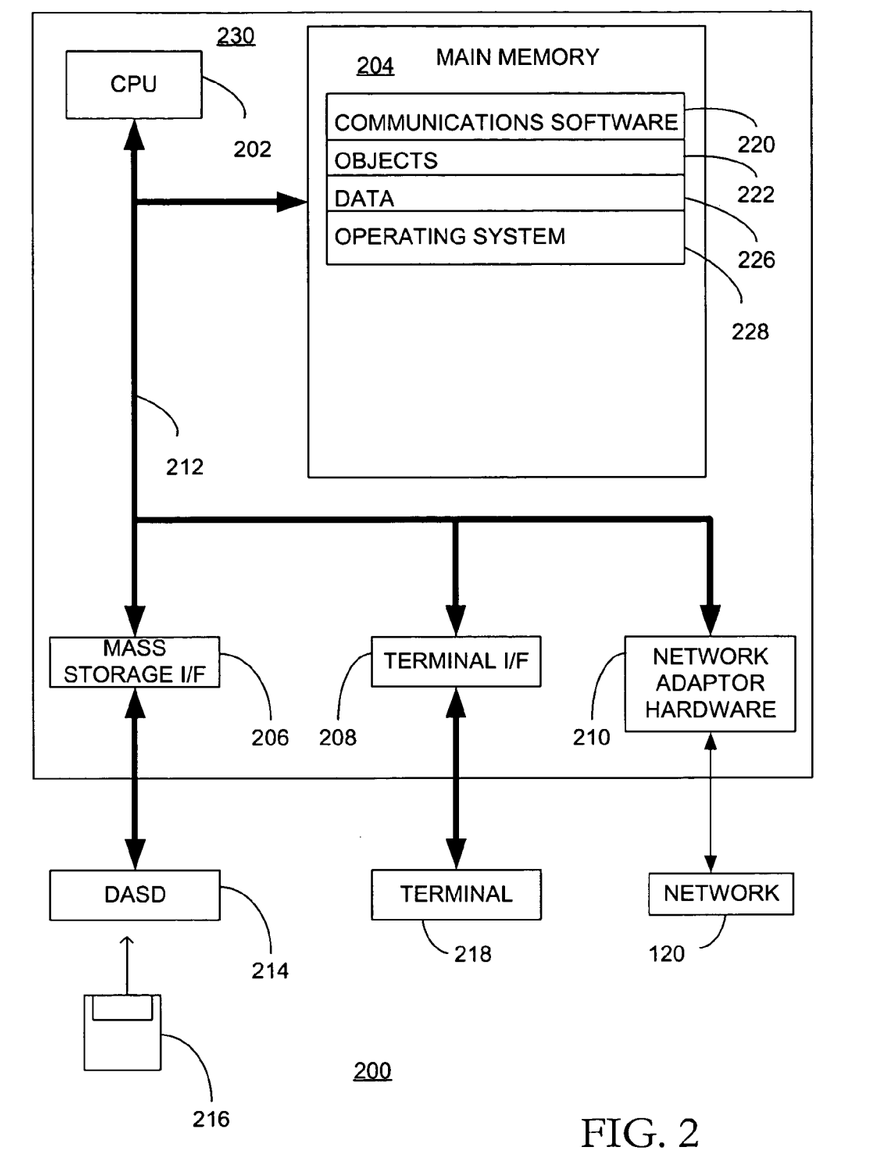
FIG. 2 is a block diagram depicting a computing node within the computing system network architecture illustrated in FIG. 1, according to an exemplary embodiment of the present invention.

A block diagram depicting a computing node 200, such as Node A 104, according to an embodiment of the present invention is illustrated in FIG. 2. The computing node 200 is based upon a suitably configured processing system adapted to implement the exemplary embodiment of the present invention. Any suitably configured processing system is similarly able to be used as a computing node 200 by embodiments of the present invention. The computing node 200 includes a computer 230. Computer 230 has a processor 202 that is connected to a main memory 204, mass storage interface 206, terminal interface 208 and network adapter hardware 210. A system bus 212 interconnects these system components. Mass storage interface 206 is used to connect mass storage devices, such as DASD device 214, to the computer system 200. One specific type of DASD device is a floppy disk drive, which may be used to store data to and read data from a floppy diskette 216, which contains a signal bearing medium.

Main Memory 204 contains communications software 220, objects 222, data 226 and an operating system image 228. Although illustrated as concurrently resident in main memory 204, it is clear that the communications software 220, objects 222, data 226 and operating system 228 are not required to be completely resident in the main memory 204 at all times or even at the same time. Computing node 200 utilizes conventional virtual addressing mechanisms to allow programs to behave as if they have access to a large, single storage entity, referred to herein as a computer system memory, instead of access to multiple, smaller storage entities such as main memory 204 and DASD device 214. Note that the term "computer system memory" is used herein to generically refer to the entire virtual memory of computing node 200.

Although only one CPU 202 is illustrated for computer 230, computer systems with multiple CPUs can be used equally effectively. Embodiments of the present invention further incorporate interfaces that each include separate, fully programmed microprocessors that are used to off-load processing from the CPU 202. Terminal interface 208 is used to directly connect one or more terminals 218 to computer 203. These terminals 218, which are able to be non-intelligent or fully programmable workstations, are used to allow system administrators and users to communicate with computing node 200.

Operating system 228 is a suitable multitasking operating system such as the IBM AIX operating system. Embodiments of the present invention are able to use any other suitable operating system. Embodiments of the present invention utilize architectures, such as an object oriented framework mechanism, that allows instructions of the components of operating system 228 to be executed on any processor located within computing node 200.

Network adapter hardware 210 is used to provide an interface to the shared communications network 120. Embodiments of the present invention are able to be adapted to work with any data communications connections including present day analog and/or digital techniques or via a future networking mechanism. The network adapter hardware 210 of the exemplary embodiment includes functions to facilitate operation of the expedited transmission processing as are described below.

Although the exemplary embodiments of the present invention are described in the context of a fully functional computer system, those skilled in the art will appreciate that embodiments are capable of being distributed as a program product via floppy disk, e.g. floppy disk 216, CD ROM, or other form of recordable media, or via any type of electronic transmission mechanism.

Cluster Node Communications Interface

Figure 3:
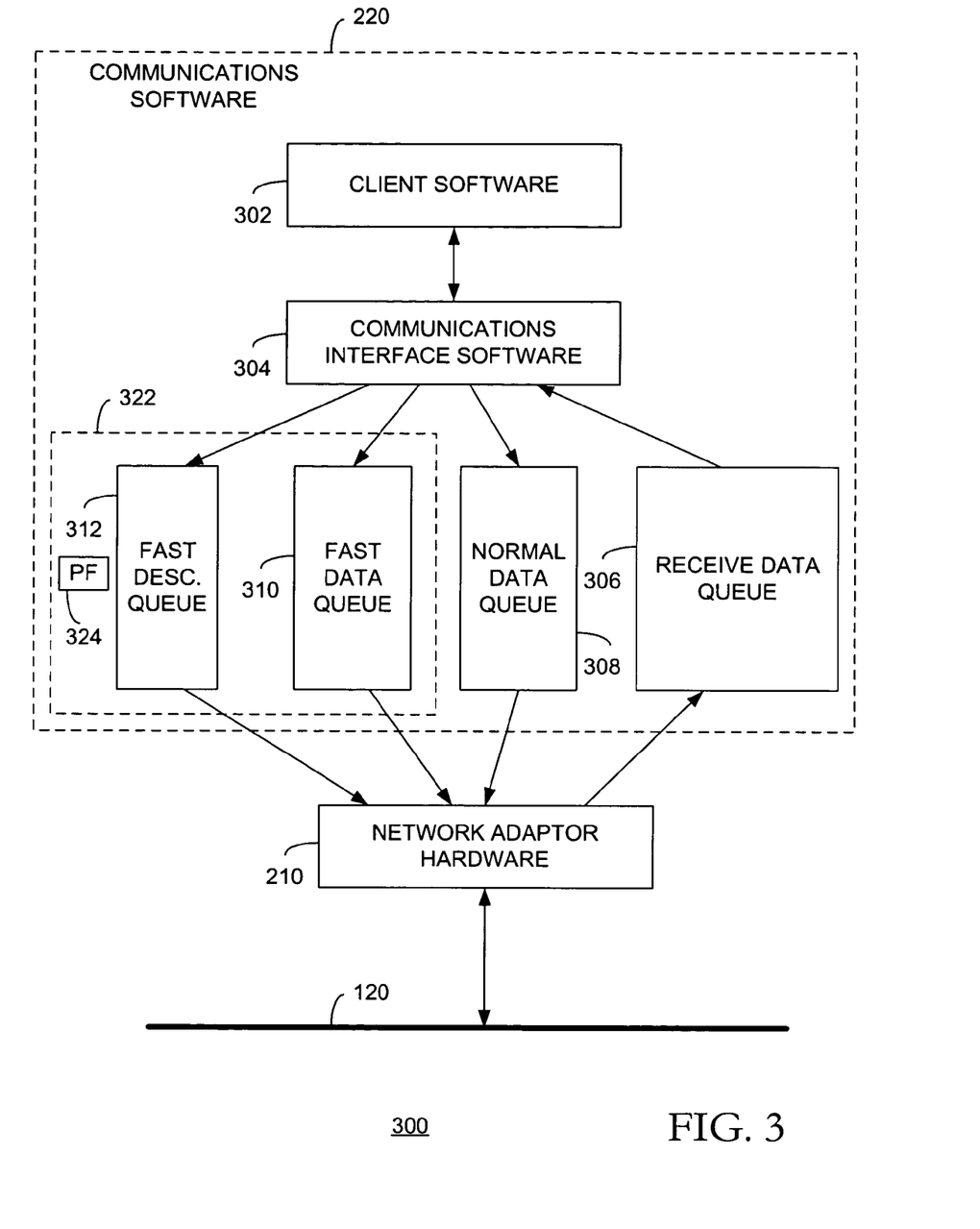
FIG. 3 is a block diagram of a communications system within a computing node illustrated in FIG. 2, according to an exemplary embodiment of the present invention.

An exemplary communications subsystem architecture 300 for an exemplary computer cluster node 102 is illustrated in FIG. 3. The exemplary communications system architecture 300 includes a client software component 302. The exemplary embodiment allows the use of client software components 302 that are designed to use conventional communications protocols and that are not specifically modified to accommodate the operation of the present invention. This advantageously allows computing systems incorporating embodiments of the present invention to use previously developed client software 302 or client software 302 that is desired to also be used in systems that do not incorporate embodiments of the present invention. Allowing the use of client software that does not require special consideration of the expedited inter-node transmission processing also simplifies software design and development of the client software 302.

The exemplary communications subsystem architecture 300 also includes a Communications Interface Software Component 304. The Communications Interface Software Component 304 of the exemplary embodiment is a software component that provides an interface that allows the Client Software 302 to send and receive messages through the network adapter hardware 210 to the shared communications network 120. The communications interface software component 304 also maintains and controls interfaces to the network adapter hardware 210. These interfaces include a number of queues, which are First In, First Out (FIFO) data buffers, that are used in conjunction with data communications and data buffering for interfacing to communications hardware components. The network adapter hardware 210 provides an electrical interface to the shared communications network 120 of the exemplary embodiment. The network adapter hardware 210 is selected based upon the type of shared communications interface 120 is used by the particular embodiment. The client software 302 and communications interface software 304, along with the data queues maintained by the communications interface software 304, are implemented as a communications processing software module 220 that is resident on a host computing node 200.

The Network adapter hardware 210 of the exemplary embodiment performs transmission and reception of data over the shared communications network 120. Each node has the network adapter hardware configured with at least one data communications address that is unique for that node. This allows the Network Adapter Hardware to determine if a data packet received over the shared communications network 120 is addressed to this particular node. The exemplary embodiment of the present invention includes a receive queue 306 that is a First In, First Out (FIFO) queue maintained by the communications interface software component 304 and is used to accumulate received data packets that are addressed for this node. The communications interface software 304 processes the received data packets and provides the received data to the proper client software component 302.

The communications interface software 304 of the exemplary embodiment maintains two data interfaces for transmission of data over the Shared Communications Network 120. A normal transmission queue 308 is used to transmit messages to any destination via conventional processing. In addition to the normal transmission queue 308, the exemplary embodiment maintains an expedited transmission queue structure 322, which includes a fast data queue 310 and a fast descriptor queue 312, to implement expedited transmission processing of data packets to a particular destination, as is described herein.

The exemplary expedited transmission queue structure 322 also has a pre-fetch flag 324. The pre-fetch flag 324 is maintained by the communications interface software component 304 in the exemplary embodiment and indicates if there is at least one descriptor from the fast descriptor queue 312 that has been pre-fetched into the network adapter hardware 210, as is described below.

Figure 4:
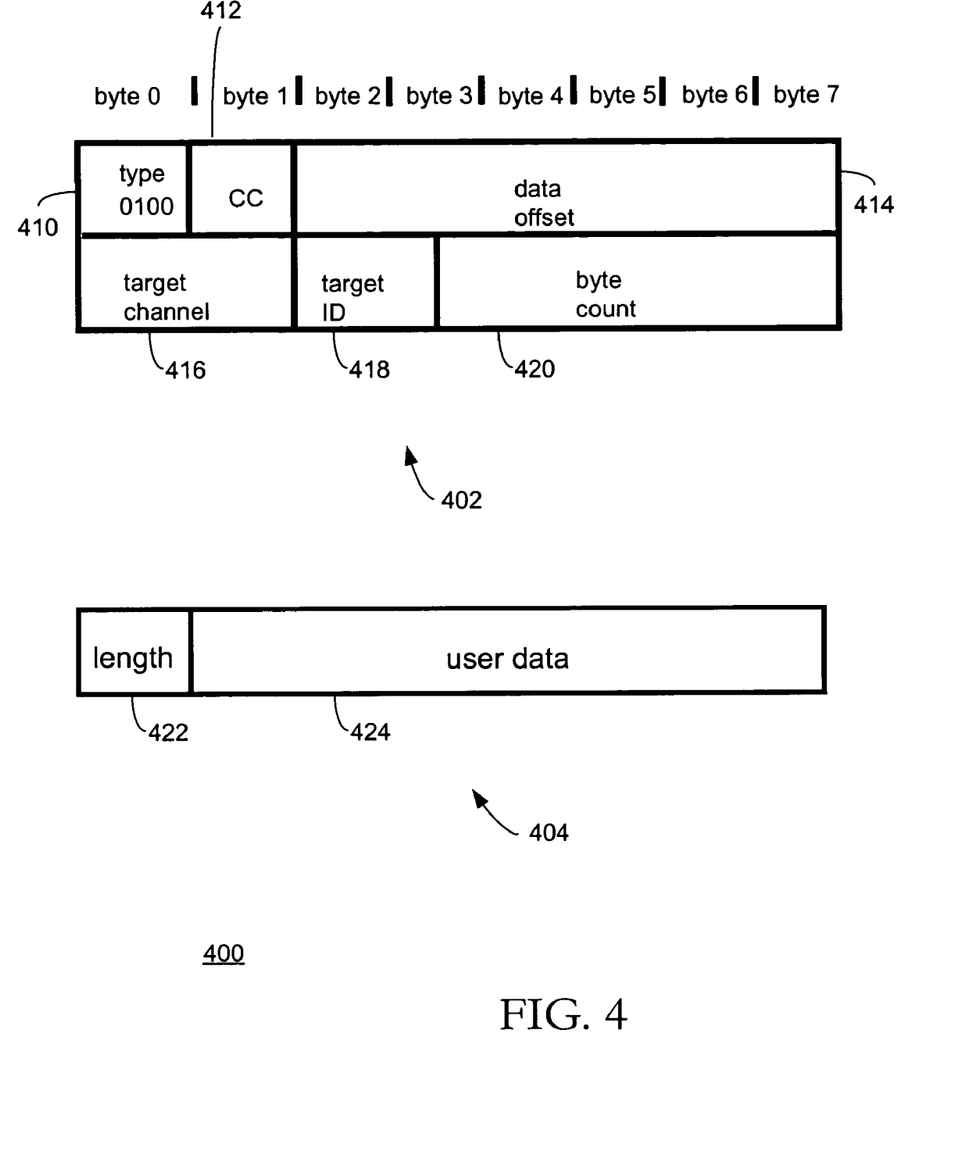
FIG. 4 is an exemplary data packet and descriptor according to an exemplary embodiment of the present invention.

An exemplary data transmission packet 400 is illustrated in FIG. 4. This exemplary data transmission packet 400 consists of two sets of data as are used by the exemplary embodiment, a descriptor 402 and a data element 404. The data element 404 contains a user data portion 424 and a length 422. The user data portion 424 contains the data that is to be delivered to the client software 302 on a remote computer. The length 422 is a data field that contains a value, such as a byte count, that specifies how much data is contained in the user data portion 424 of the data element 404.

The descriptor 402 of the exemplary embodiment contains information that is used by the data transmission processes to properly transmit and deliver the data element 404 to the desired destination. The descriptor 402 includes a type indicator 410, a Completion Code or 'CC' indicator 412, a data offset value 414, a target channel indicator 416, a target ID indicator 418 and a byte count 420. The Type indicator 410 specifies the type of descriptor and is used to properly parse the data in the descriptor 402. The 'CC' indicator 412 is a 'completion code' indicator and is used to indicate if the data element 404 that is associated with this descriptor has been transmitted by the adapter. When a receiving node receives a data transmission packet 400 with the CC indicator 412 set to true, the data transmission is complete and the accumulated data from the associated packet has been transferred to the client software 302. The data offset 414 indicates the location of the data element 404 within the transmission queue 310 and is used by the network adapter hardware 210 to access the data element 404.

The target channel 416 of the exemplary embodiment indicates a uniquely identified logical adapter resource that represents a connection into the network and the Target ID 418 indicates the destination adapter address for the data transmission packet 400. Together the target channel and target ID form a generic Media Access Control (MAC) address. The byte count 420 indicates how many bytes of valid data are contained within the user data portion 424.

Figure 5:
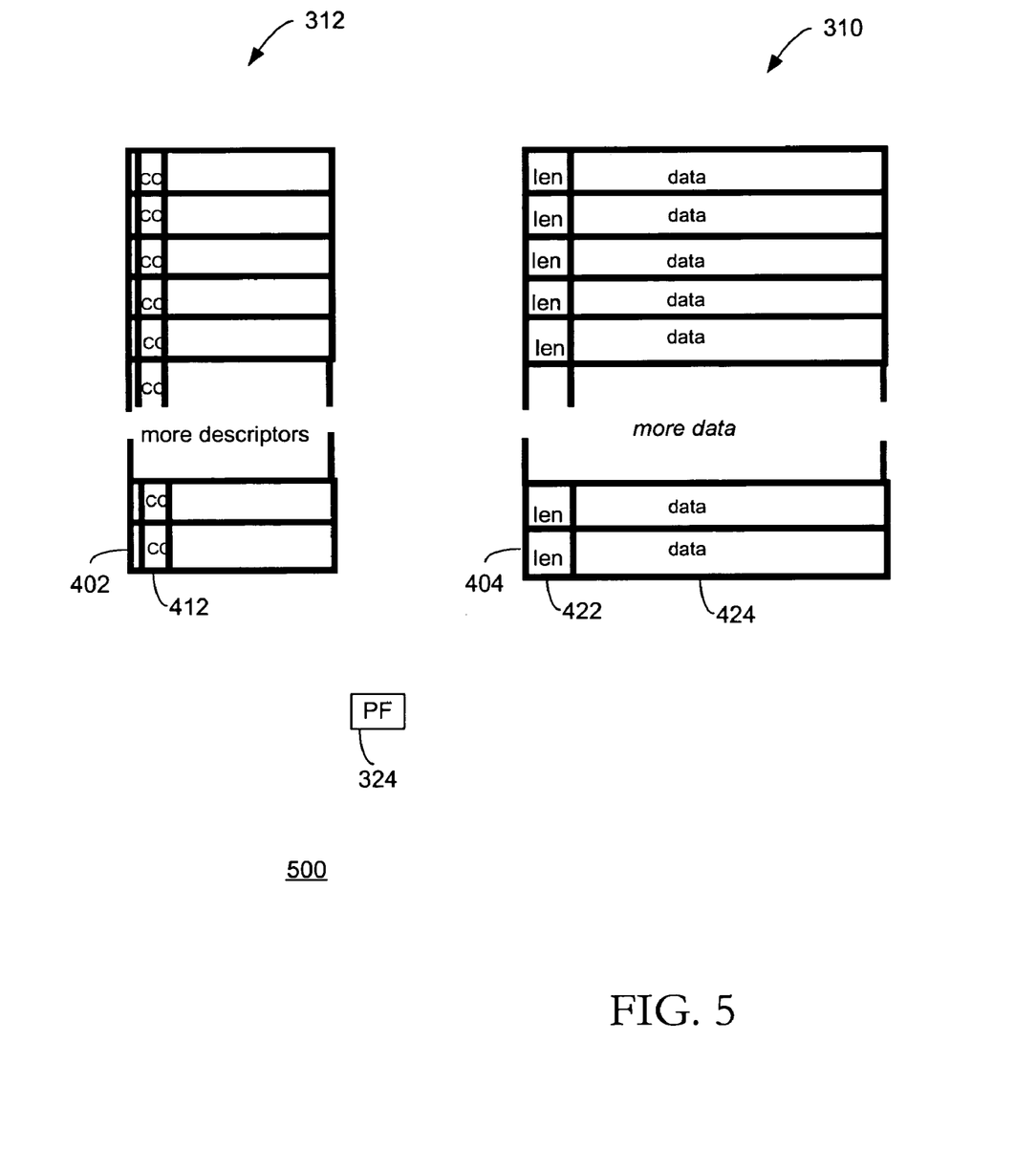
FIG. 5 is a data contents diagram of an exemplary fast transmission queue structure as is used by a computing node illustrated in FIG. 2, according to an exemplary embodiment of the present invention.

A detailed diagram showing the contents of an exemplary fast transmission queue structure 322 as is used by an exemplary embodiment of the present invention is illustrated in FIG. 5. The exemplary fast transmission queue structure 322 includes the fast data transmission queue 310 and the fast descriptor queue 312. These two queues are shown to have a number of entries. The exemplary embodiment operates by pairing a descriptor 402 with a corresponding data element 404. Each descriptor 402 in this exemplary fast transmission queue 322 has a 'CC' indicator 412. The data elements 404 in the fast data transmission queue 310 similarly all have a length indicator 422 and a user data portion 424. Alternative embodiments of the present invention operate with a single queue to queue entire data packets 400.

Operation of the exemplary embodiment is enhanced by using data elements 404, or user data portions 424 of the data elements 404 depending upon which of these is transferred into the processor memory by the network adapter interface, that contain a number of bytes that is exactly equal to the number of bytes within one line of the cache buffer used to transfer the data between network adapter hardware 210 and the data queues. This advantageously allows improved efficiencies for the operation of the interface between the network adapter hardware 210 and the memory used by the host system, such as the fast data transmission queue 310 and the receive queue 306. Embodiments of the present invention include hardware interfaces that are able to efficiently transfer cache line size elements into system memory in order to increase the operating efficiency of the communications system, such as by transferring such elements with atomic operations.

The exemplary embodiments of the present invention operate by preparing descriptors that are preloaded into the fast descriptor queue 312 that can be pre-fetched by the communications adapter hardware 210. The operation of the exemplary embodiment of the present invention results in each of the descriptors 402 containing the same data in the type field 410 and the 'CC' field 412. The operation of the exemplary embodiment uses constant size data elements in the user data 424. This results in the byte count field 420 of each data descriptor 402 similarly containing the same value. The use of equal size messages by the exemplary embodiment also allows a predetermination of the value to be stored in the data offset 414 field. This facilitates preconstruction of the descriptor 402 and preloading of the fast descriptor queue 312 with descriptors. Given these fixed values for a data transmission packet using the expedited data transmission processing of the exemplary embodiment, the remaining fields of the descriptor 402 that are able to change are the data packet destination addressing information contained within the target channel field 416 and the target ID field 418. The operation of the exemplary embodiment of the present invention usually use the same destination address for a fast transmission queue structure 322, so these values are also able to be pre-loaded into descriptors 402 that are then pre-loaded into the fast descriptor queue 312. These addresses are speculatively pre-defined since the fast transmission queue structure speculates upon the destination address of the packets to be send via that mechanism. The operation of the exemplary embodiment also allows these pre-loaded descriptors to be flushed from the fast descriptor queue 312 and network adapter hardware 210 in order to immediately effect a change in the destination address for future transmissions through the use of expedited transmission processing. As illustrated in the exemplary data transmission packet 400, the target channel 416 and the target ID 418 fields in the exemplary embodiment only contain three and one half bytes of data.

The network adapter hardware 210 of the exemplary embodiment is also configured to support expedited data transmission processing using the expedited transmission queue structure 322. The network adapter hardware 210 is configured to accept one or more commands that cause the network adapter hardware 210 to "pre-fetch" descriptors 402 from the fast descriptor queue 312. The network adapter hardware 210 of the exemplary embodiment is therefore able transmit a data element 404 while simultaneously pre-fetching a descriptor 402 for the next data element 404 that is to be transmitted. This allows the network adapter hardware 210 to perform the setup and addressability processing, as well as the handshaking exchange between the software and the adapter, to be moved out of the critical timeline path for data transfer.

Processing Flows

Figure 6:
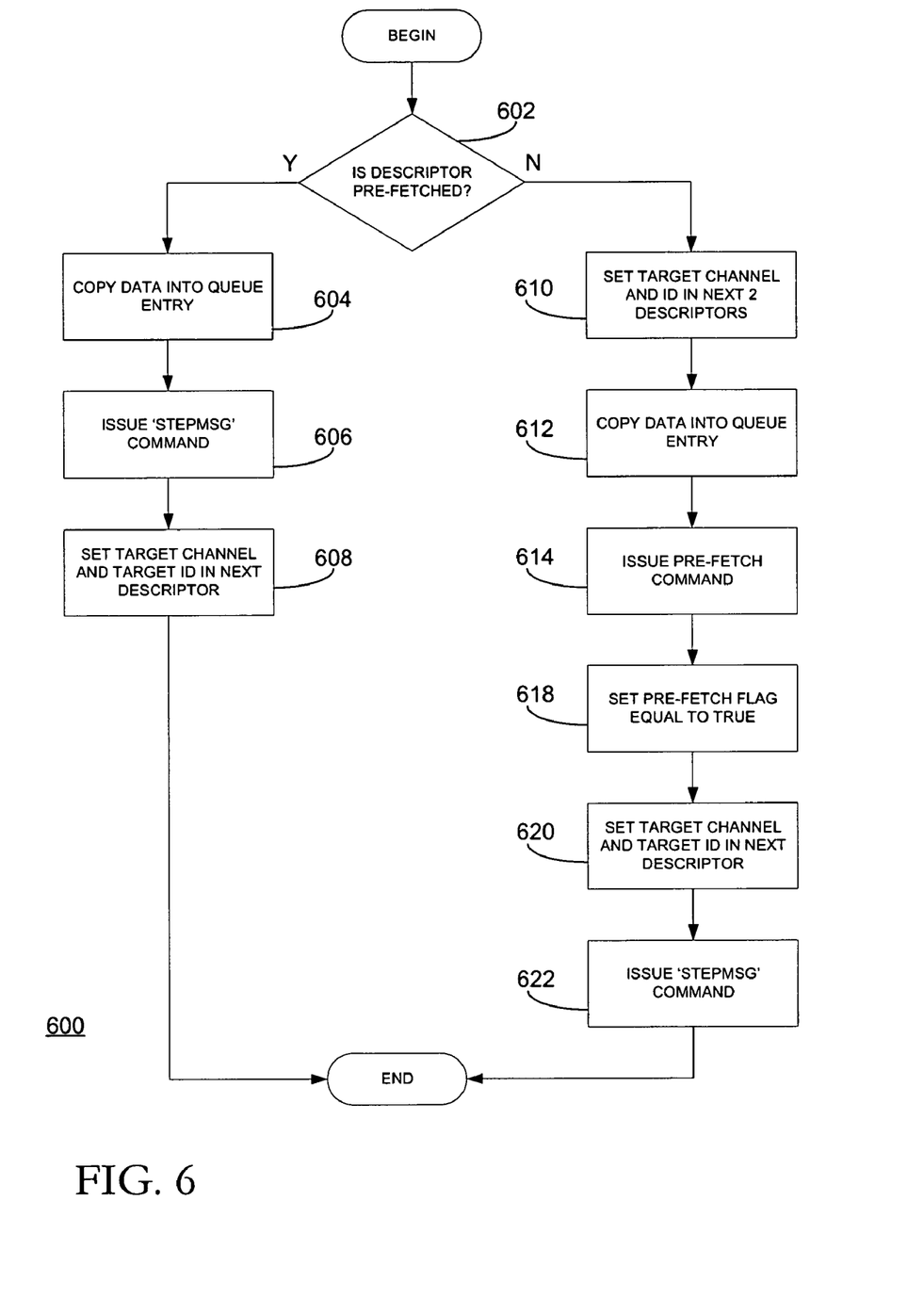
FIG. 6 is a processing flow diagram for expedited transmission processing of a data element to a pre-defined destination according to an exemplary embodiment of the present invention.

A top level expedited data transmission processing flow 600 as is performed by an exemplary embodiment of the present invention is illustrated in FIG. 6. The processing begins by determining, at step 602, if a pre-fetched descriptor is already constructed and pre-fetched by the network adapter hardware 210. The exemplary embodiment maintains a pre-fetch flag 502 to indicate if a pre-fetch descriptor has been pre-fetched into the network adapter hardware 210. If it was determined that there was no pre-fetched descriptor, the processing of the exemplary embodiment proceeds to set, at step 610, the target channel field 416 and the target ID field 418 in the next 2 descriptors in the fast descriptor queue 312. Setting these fields in two descriptors supports the pre-fetching of descriptor data for the first data element to be transmitted as well as the subsequent pre-fetching, which is performed during the transmission of the first data element, of the descriptor for the second data element. The operation of the exemplary embodiment of the present invention includes pre-fetching, by the network adapter hardware 210, of the descriptor for the second data element while the first data element is being transmitted. This operation is supported in the exemplary embodiment by pre-configuring two descriptors in the fast descriptor queue 312 prior to initiating data transmission.

The processing of the exemplary embodiment then continues by copying, at step 612, user data into the user data portion 424 of a data element 404 in the fast transmission data queue 310. In this instance, the processing of the communications interface software component 304 of the exemplary embodiment copies the user data into the data element 404 that is associated with the first descriptor in the fast descriptor queue 312. The processing then issues, at step 614, a pre-fetch command to the network adapter hardware 210, and sets the pre-fetch flag to true, at step 618. The pre-fetch command causes the specially configured network adapter hardware 210 of the exemplary embodiment to pre-fetch the descriptor 402 from the fast descriptor queue 312 and to begin configuration of the communications circuits for transmission of the next data element 404.

The processing of the exemplary embodiment then continues to prepare for the transmission of the next data element 404 by setting, at step 620, the value of the target channel field 416 and the target ID field 418 in the next descriptor 402 to the values that specify the destination of the next data element to be transmitted. The processing of the communications interface software 304 of the exemplary embodiment then issues, at step 622, the STEPMSG command to the network adapter hardware 210. The STEPMSG command causes the network adapter hardware 210 to use the pre-fetched descriptor data and to then use Direct Memory Access (DMA) to copy the data element 404 from the system memory containing the fast data queue 310 directly into the communications network fabric. The STEPMSG command also causes the network adapter hardware 210 to pre-fetch the next descriptor 402 in order to prepare for transmission of the next data element. Processing for the transmission of this data element then terminates.

If there was determined, at step 602, to be a pre-fetched descriptor, the processing continues by copying, at step 604, data into a data element 404 in the data queue 310. The processing then issues, at step 606, a STEMPSG command to the network adapter hardware. The operation of the STEPMSG command is described above. The STEPMSG command causes the data element 404 to be transmitted across the network to the pre-configured destination. The processing then sets, at step 608, the target channel and target ID in the next descriptor in the fast descriptor queue 312 in preparation for the next data transmission. The processing for the transmission of this data element then terminates.

Figure 7:
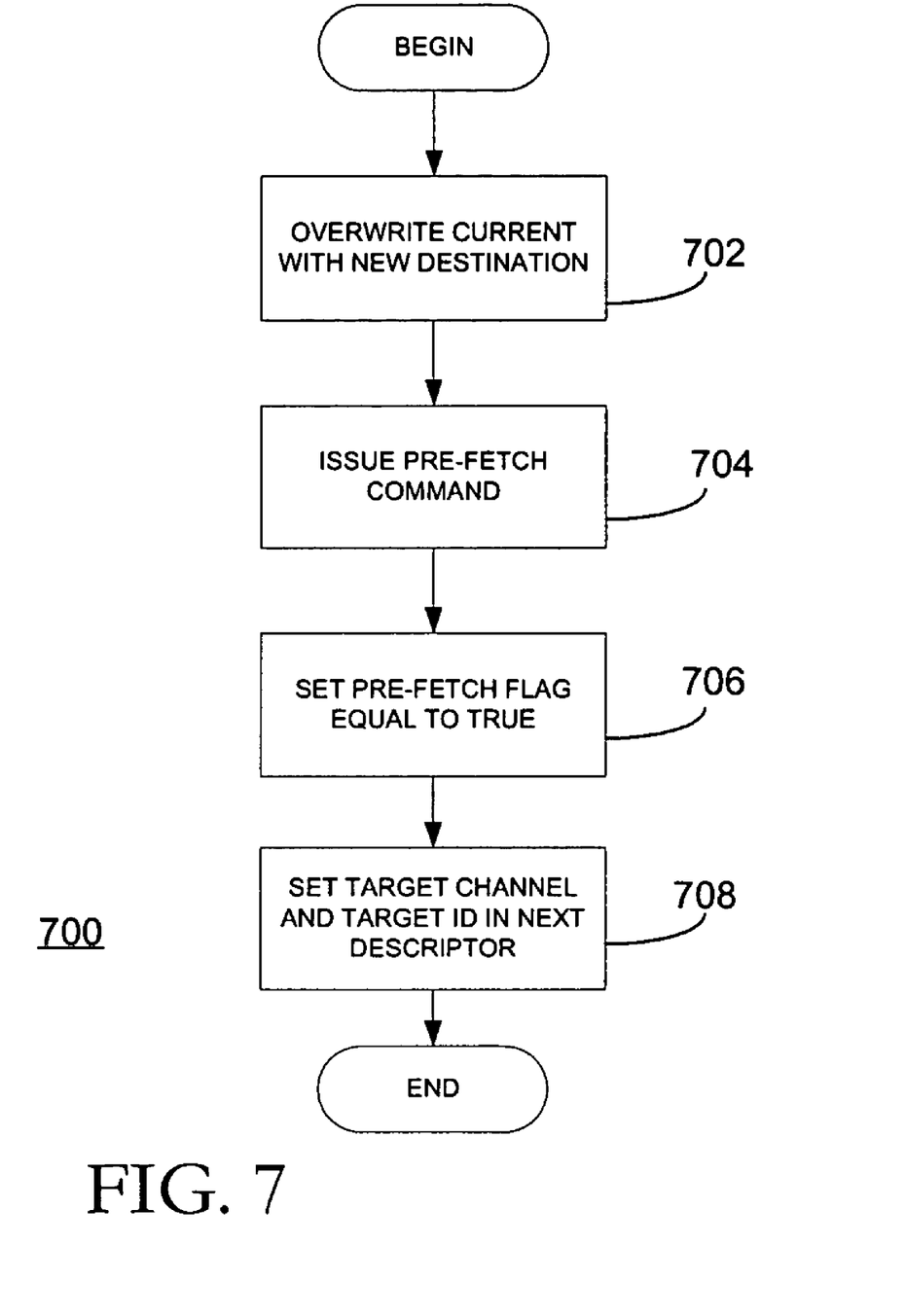
FIG. 7 is a processing flow diagram for changing the destination of the pre-defined destination used for expedited transmission processing according to an exemplary embodiment of the present invention.

An exemplary change destination processing flow diagram 700 for changing the destination after descriptors have been pre-fetched into the network adapter hardware 210 as is performed by the exemplary embodiment of the present invention is illustrated in FIG. 7. As discussed above, the operation of the exemplary embodiments of the present invention includes causing the network adapter hardware 210 to pre-fetch packet descriptors prior to transmission of the associated data element 404. This requires at least two descriptors, along with a specification of the destination for the packets that are associated with those descriptors, to be pre-defined prior to beginning the transmission of data elements 404. The exemplary embodiment supports changing of the destination of data elements via the exemplary change destination processing flow 700. The exemplary change destination processing flow 700 beings by overwriting, at step 702, the new destination into the destination fields that had been previously set in the next descriptor 402. The next descriptor 402 in this context is the next descriptor 402 in the fast descriptor queue 312 that is to be fetched by the network adapter hardware 210. The processing then issues, at step 704, a pre-fetch command to the network adapter hardware 210. The pre-fetch command causes the network adapter hardware 210 to clear any previously pre-fetched descriptors 402 and to pre-fetch a new descriptor 402. The processing then sets, at step 706, the destination data within the then next descriptor 402 in the fast descriptor queue 312. The processing then terminates.

Figure 8:
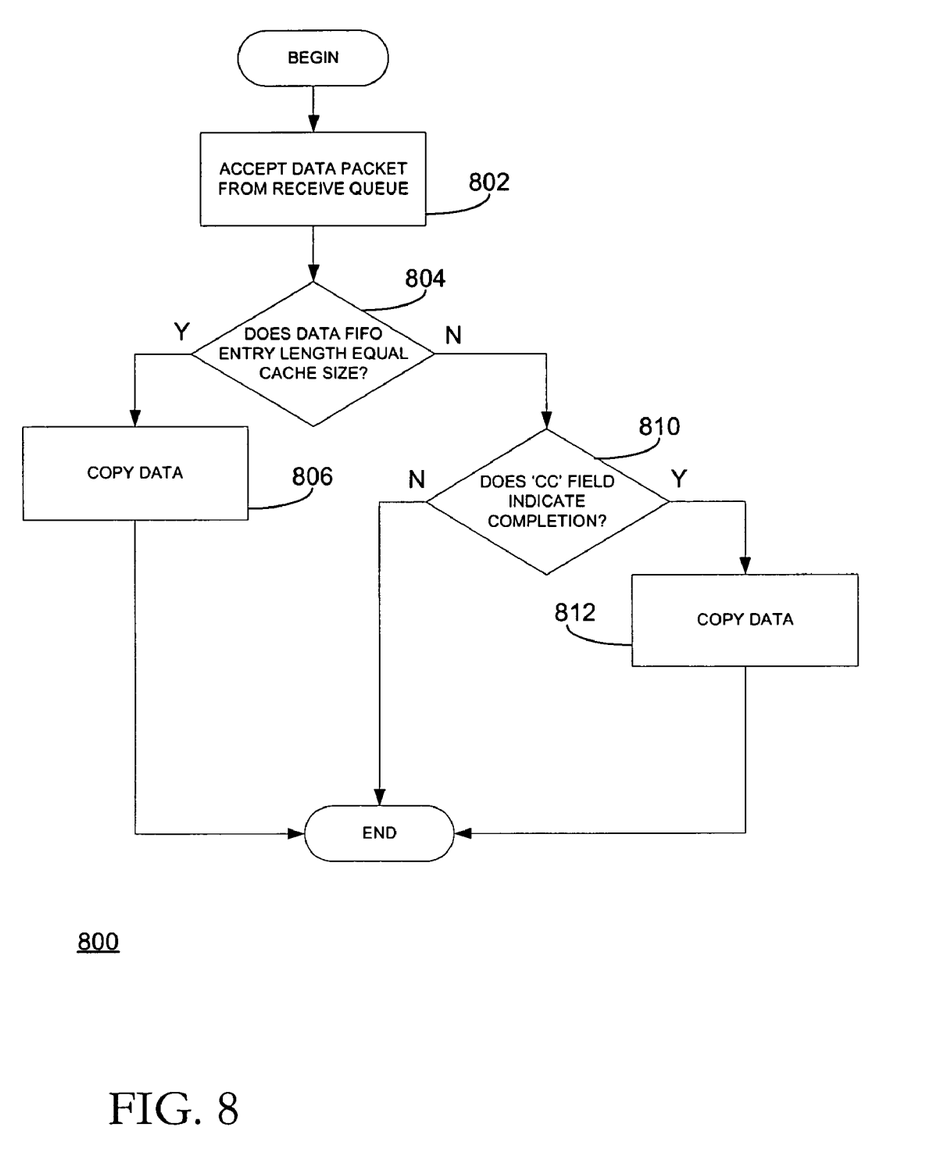
FIG. 8 is a processing flow diagram for receiving a data element at a node according to an exemplary embodiment of the present invention.

An exemplary fast packet receive processing flow 800 as is performed by the exemplary embodiment of the present invention is illustrated in FIG. 8. The exemplary embodiment receives data packets from all computing nodes on the shared communications network 120 via the network adapter hardware 210 and places these packets into a common receive data queue 306. The software retrieving these packets from the receive data queue 306 is optimized to handle elements of a length equal to one main memory 204 controller cache line by performing atomic writing of data elements that have a length equal to one cache line. The exemplary embodiment begins packet receive processing by accepting, at step 802, a data packet from the receive queue 306. Received data packets are loaded into the receive queue 306 by the network adapter hardware 210 and the communication interface software 304 processes these packet in turn. The processing then advances by determining, at step 804, if the data FIFO entry equals the size of a data cache buffer. If the length of the data FIFO entry is equal to the size of the data cache buffer, the processing is able to simply copy the data into the user buffer in the client software 302. The processing then continues by copying, at step 806, the data into a user buffer managed by the client software 302.

If the data FIFO entry length was determined to not be equal to the length of the data cache, the processing advances by determining, at step 810, if the 'CC' indicator indicates that the data transmission is complete. If the 'CC' indicator indicates that the data transmission is complete with this packet, the data is copied, at step 812, into the user buffer managed by client software 302. If the 'CC' indicator does not indicate that the data transmission is complete with this packet, the processing for the receipt of this data packet terminates.

Figure 9:
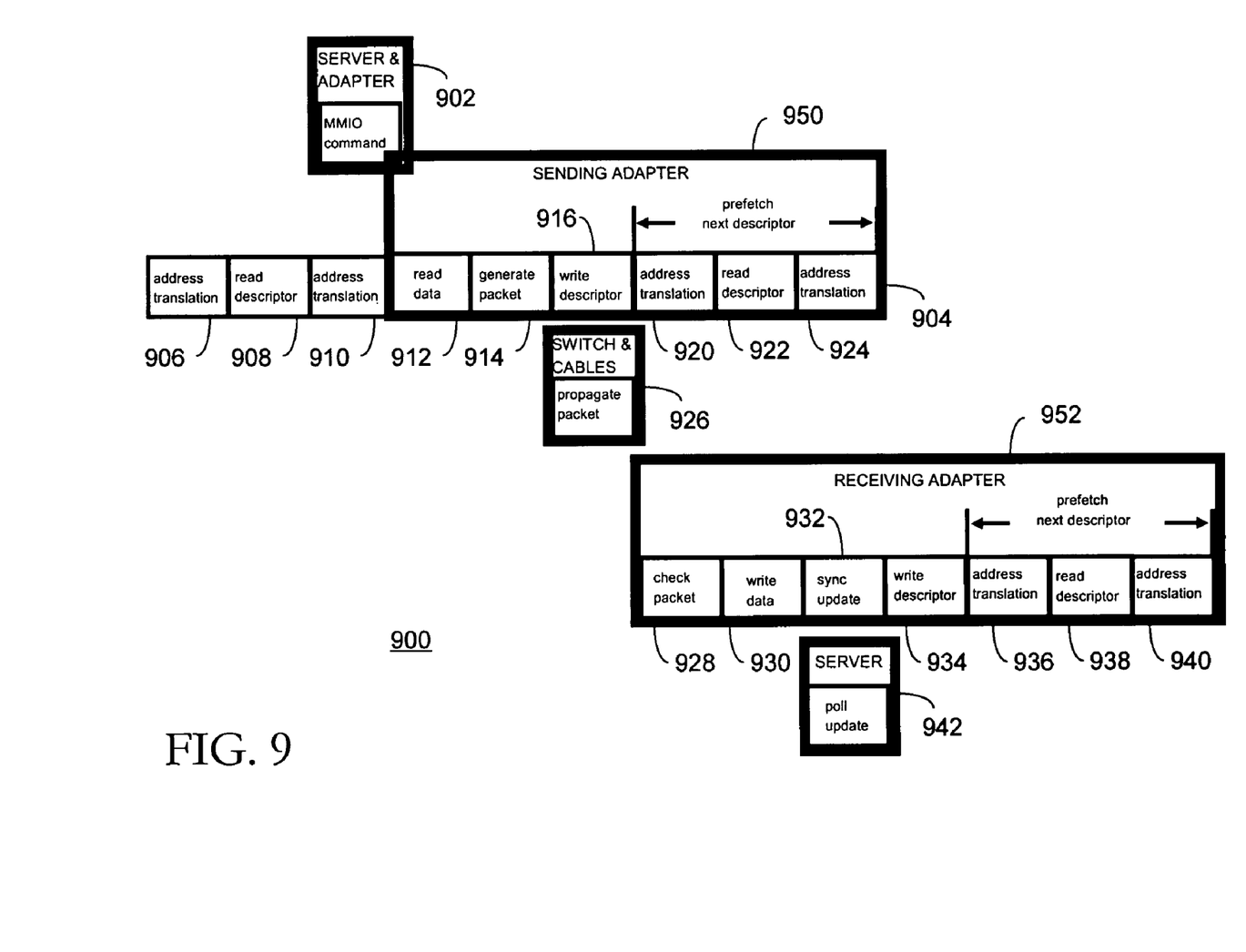
FIG. 9 is a time line diagram illustrating an expedited transmission of a data packet to a pre-defined destination according to an exemplary embodiment of the present invention.

FIG. 9 illustrates an expedited packet transmission shown in a time line diagram 900 for the transmission of a data packet to a pre-defined destination as is performed by an exemplary embodiment of the present invention. The expedited packet transmission processing timeline 900 illustrates the processing used to transfer a data packet from a transmitting node to a receiving node. The packet transmission processing timeline 900 illustrates the "critical path" processing and does not focus upon the other processing operations that do not impact the critical timing for transmission performance. The processing at the two nodes is illustrated by the transmitting or sending adapter processing 950 and the receiving adapter processing 952. The packet transmission timeline begins for the transmission of this data packet 400 by receipt at 902 of the MMIO command to the communications server and adapter to transmit the packet. The MMIO command is an operating system command of the exemplary embodiment to transfer data over a communications network. Prior to the receipt of this command, the sending adapter has already pre-fetched the descriptor 908 and performed address translation as required for that descriptor. These steps were performed during the transfer of the previous data element 404. Once the command is received, the sending network adapter hardware reads the data to be transmitted from the fast data queue 310. The network adapter hardware then generates a packet 914 and writes the completion code in the send descriptor 916. After writing the completion code in the descriptor, the sending adapter continues to perform processing in preparation for the transmission of the next data element. This processing consists of the steps of descriptor address translation 920, read descriptor 922 and data address translation 924.

In parallel with writing the send descriptor 916, the packet propagates 926 across the shared communication network 120. The packet is then received by the receiving network adapter hardware and the receive adapter processing 952 begins on that node for this packet. The receiving adapter checks the packet 928 using conventional packet checking techniques. The receiving adapter then writes the data 930 into the receive queue 306. The receive adapter then insures that all memory updates have completed with the sync update 932. The data can now be read by the software on the server 942 that is polling for incoming packets before the receiving adapter has actually written the completion code 934 for the corresponding descriptor. Once the receiving adapter has written the 'CC' into the receive descriptor, it then pre-fetches the next receive descriptor. This processing consists of the steps of descriptor address translation 936, read descriptor 938 and data address translation 940.

Non-Limiting Software and Hardware Examples

Embodiments of the invention can be implemented as a program product for use with a computer system such as, for example, the cluster computing environment shown in FIG. 1 and described herein. The program(s) of the program product defines functions of the embodiments (including the methods described herein) and can be contained on a variety of signal-bearing medium. Illustrative signal-bearing medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method, in a computer node, for transferring a data message, the method comprising:
    identifying a pre-defined destination node, the pre-defined destination node being within a plurality of remote computer nodes to which data packets are able to be sent over a data communications network;
    queuing, in an expedited transmission queue that is separate from a normal data packet queue, a first data packet that is addressed to the pre-defined destination node, wherein the normal data packet queue is used to queue data packets for transmission to other computing systems within the plurality of remote computer nodes, the other computing systems comprising destination nodes that are not the pre-defined destination node;
    sending, through a communications adapter, the first data packet to the pre-defined destination node;
    loading a packet descriptor associated with a second data packet into the communications adapter, wherein the loading is concurrent with the sending and the packet descriptor identifies a second destination node that is the pre-defined-destination node; and
    transferring, in dependence upon the packet descriptor, the second data packet to the second destination node over the data communications network.

2. The method according to claim 1, wherein the expedited transmission queue comprises a fast data queue, and wherein the sending of the first data packet and the transferring of the second data packet comprises loading the first data packet and the second data packet into the fast data queue, wherein the fast data queue only queues data packets for transmission to the pre-defined destination node over the data communications network.

3. The method according to claim 1, wherein at least one of the first data packet and the second data packet each comprise a user data portion that is equal to a size of a cache buffer.

4. The method according to claim 1, wherein the loading further comprises configuring, concurrently with the sending of the first data packet to the pre-defined destination node, the communications adapter for the transferring of the second data packet to the pre-defined destination node over the data communications network.

5. The method according to claim 1, wherein the expedited transmission queue comprises a fast data queue and a fast descriptor queue, and
    wherein the loading comprises loading the packet descriptor into the fast descriptor queue for subsequent transfer to the communications adapter, and wherein the method further comprises loading the second data packet that is associated with the packet descriptor into the fast data queue.

6. The method according to claim 5, further comprising:
    altering the packet descriptor, after the loading the packet descriptor and while the packet descriptor is in the fast descriptor queue, so as to change the second destination node to be a remote destination node that is different than the pre-defined destination node, and
    reloading the packet descriptor into the communications adapter after the altering and prior to transferring the second data packet.

7. The method according to claim 1, where in the loading is performed prior to receiving a command to transfer data contained in the second data packet to the pre-defined destination.

8. The method according to claim 1, wherein the pre-defined destination is one of an adaptive nearest neighbor node within a cluster.

9. A computing node comprising:
    a processor;
    a main memory;
    a fast data element transmitter adapted to:

identify a pre-defined destination node, the pre-defined destination node being within a plurality of remote computer nodes to which data packets are able to be sent over a data communications network;

queue, in an expedited transmission queue that is separate from a normal data packet queue, a first data packet that is addressed to the pre-defined destination node, wherein the normal data packet queue is used to queue data packets for transmission to other computing systems within the plurality of remote computer nodes, the other computing systems comprising destination nodes that are not the pre-defined destination node;

send, through a communications adapter, the first data packet to the pre-defined destination node; and a fast descriptor interface adapted to load a packet descriptor associated with a second data packet into the communications adapter concurrently with the sending of the first data packet by the fast data element transmitter, wherein the packet descriptor identifies the pre-defined destination and is used to configure the fast data packet transmitter for transferring a second data element, and wherein the fast data element transmitter is further adapted to transfer, in dependence upon the packet descriptor, the second data packet to the second destination node over the data communications network.

10. The computing node according to claim 9, further comprising a fast data queue within the expedited transmission queue for queuing data elements for transmission to the pre-defined destination node, and wherein the fast data element transmitter is further adapted to send the first data packet and transfer the second data packet by loading the first data packet and the second data packet into the fast data queue, wherein the fast data queue only queues data packets for transmission to the pre-defined destination node over the data communications network.

11. The computing node according to claim 9, wherein at least one of the first data packet and the second data packet each comprise a user data portion that is equal to a size of a cache buffer.

12. The computing node according to claim 9, wherein the pre-defined destination node is associated with a neighboring computer node.

13. The computing node according to claim 9, further comprising a fast descriptor queue within the expedited transmission queue for queuing the packet descriptor for subsequent transfer to the fast descriptor interface, wherein the fast descriptor interface loads the packet descriptor into the fast descriptor queue for subsequent transfer to the communications adapter, and wherein the fast data element transmitter loads the second data packet that is associated with the packet descriptor into the fast data queue.

14. A non-volatile memory tangibly encoded with a program which, when executed by a processor, performs operations for transferring a data message, the operations comprising:

identifying a pre-defined destination node, the pre-defined destination node being within a plurality of remote computer nodes to which data packets are able to be sent over a data communications network;

queuing, in an expedited transmission queue that is separate from a normal data packet queue, a first data packet that is addressed to the pre-defined destination node, wherein the normal data packet queue is used to queue data packets for transmission to other computing systems within the plurality of remote computer nodes, the other computing systems comprising destination nodes that are not the pre-defined destination node;

sending, through a communications adapter, the first data packet to the pre-defined destination node;

loading a packet descriptor associated with a second data packet into the communications adapter, wherein the loading is concurrent with the sending and the packet descriptor identifies a second destination node that is the pre-defined destination node; and transferring, in dependence upon the packet descriptor, the second data packet to the second destination node over the data communications network.

15. The non-volatile memory of claim 14, wherein the expedited transmission queue comprises a fast data queue, and wherein the sending of the first data packet and the transferring of the second data packet comprises loading the first data packet and the second data packet into the fast data queue, wherein the fast data queue only queues data packets for transmission to the pre-defined destination node over the data communications network.

16. The non-volatile memory of claim 14, wherein each of at least one of the first data packet and the second data packet each comprise a user data portion that is equal to a size of a cache buffer.

17. The non-volatile memory of claim 14, wherein the loading further comprises configuring, concurrently with the sending of the first data packet to the pre-defined destination node, the communications adapter for the transferring of the second data packet to the pre-defined destination node over the data communications network.

18. The non-volatile memory of claim 14, wherein the expedited transmission queue comprises a fast data queue and a fast descriptor queue, and wherein the loading operation comprises loading the packet descriptor into the fast descriptor queue for subsequent transfer to the communications adapter, and wherein the method further comprises loading the second data packet that is associated with the packet descriptor into the fast data queue.

19. The non-volatile memory of claim 18, wherein the operations further comprise altering the packet descriptor, after the loading the packet descriptor and while the packet descriptor is in the fast descriptor queue, so as to change the second destination node to be a remote destination node that is different than the pre-defined destination node, and reloading the packet descriptor into the communications adapter after the altering and prior to transferring the second data packet.

* * * * *